(12) United States Patent
Masseni (10) Patent No.: US 12,351,004 B2
(45) Date of Patent: Jul. 8, 2025

(54) SYSTEM FOR TREATING THE AIR IN THE CABIN OF A VEHICLE VIA AN AIR FILTER WITH AN RFID TAG

(71) Applicant: DENSO THERMAL SYSTEMS S.P.A., Poirino (IT)

(72) Inventor: Davide Masseni, Poirino (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 358 days.

(21) Appl. No.: 17/772,496

(22) PCT Filed: Nov. 12, 2020

(86) PCT No.: PCT/IB2020/060646
§ 371 (c)(1),
(2) Date: Apr. 27, 2022

(87) PCT Pub. No.: WO2021/094965
PCT Pub. Date: May 20, 2021

(65) Prior Publication Data
US 2022/0379689 A1 Dec. 1, 2022

(30) Foreign Application Priority Data
Nov. 14, 2019 (IT) .................. 102019000021153

(51) Int. Cl.
*B60H 3/06* (2006.01)
*B01D 46/00* (2022.01)
(Continued)

(52) U.S. Cl.
CPC ......... *B60H 3/0616* (2013.01); *B01D 46/009* (2013.01); *B01D 46/10* (2013.01);
(Continued)

(58) Field of Classification Search
CPC ................ B01D 46/009; B01D 46/429; B60H 1/00378; H04W 4/80
See application file for complete search history.

(56) References Cited

U.S. PATENT DOCUMENTS 6,758,739 B1 * 7/2004 Sangwan ............. B60H 3/0085 454/75
2004/0011713 A1 * 1/2004 Ushioda ............... B01D 46/009 96/417
(Continued)

FOREIGN PATENT DOCUMENTS

CN 110953099 A * 4/2020 ............. F02M 35/09
DE 102008049862 A1 4/2010
(Continued)

OTHER PUBLICATIONS

James Thrasher, RIFD versus NFC: What's the difference between NFC and RFID?, Oct. 11, 2013, atlasRFIDstore https://www.atlasrfidstore.com/rfid-insider/rfid-vs-nfc/ (Year: 2013).*
(Continued)

*Primary Examiner* — Jorge A Pereiro
*Assistant Examiner* — Michael James Giordano
(74) *Attorney, Agent, or Firm* — Merchant & Gould P.C.

(57) ABSTRACT

A system (10) for treating the air in the cabin of a vehicle includes a casing, an air conditioning apparatus, a filtering device (16) an RFID tag (28) containing identification information about the filtering device (16). An RFID reader (30) co-operates with the RFID tag (28) to read the identification information. A control unit (32) is connected to the RFID reader (30) and configured for receiving the identification information and for executing predefined operations as a function of the identification information.

16 Claims, 8 Drawing Sheets

(51) Int. Cl.
  *B01D 46/10* (2006.01)
  *B01D 46/42* (2006.01)
  *B60H 1/00* (2006.01)
  *H04W 4/80* (2018.01)

(52) U.S. Cl.
  CPC ....... *B01D 46/429* (2013.01); *B60H 1/00378* (2013.01); *H04W 4/80* (2018.02); *B60H 2003/0683* (2013.01)

(56) References Cited

U.S. PATENT DOCUMENTS

| | | | |
|---|---|---|---|
| 2011/0220560 A1* | 9/2011 | Verdegan ............ | G01M 15/042 210/90 |
| 2016/0001102 A1* | 1/2016 | Huh ........................ | A62B 7/10 128/206.17 |
| 2019/0001250 A1* | 1/2019 | Moredock ............ | B01D 46/446 |

FOREIGN PATENT DOCUMENTS

| | | |
|---|---|---|
| EP | 1985351 A1 | 10/2008 |
| FR | 3031320 A1 | 7/2016 |

OTHER PUBLICATIONS

International Search Report and Written Opinion for PCT/IB2020/060646. (Dec. 22, 2020).

\* cited by examiner

SYSTEM FOR TREATING THE AIR IN THE CABIN OF A VEHICLE VIA AN AIR FILTER WITH AN RFID TAG

This application is a National Stage Application of PCT/IB2020/060646, filed Nov. 12, 2020, which claims priority to Application No. 102019000021153, filed Nov. 14, 2019, in Italy, and which applications are incorporated herein by reference. To the extent appropriate, a claim of priority is made to each of the above disclosed applications.

TECHNICAL FIELD

The present invention relates to a system for treating the air in the cabin of a vehicle, in particular for an agricultural machine.

BACKGROUND ART

In the technical field of vehicular cabins there is the need for filtering the air taken in for controlling the climate in the cabin. This need is particularly felt in agricultural machines, in that their air conditioning systems include filters configured for removing contaminants from the intake air, such as pesticides, fertilizers and plant protection products, which might enter the cabin and make it dangerous.

Document EP 1 985 351 A1 discloses a device for use in a motor vehicle which includes a filter unit with a housing structure and a filter insert having a frame and a filter element. The filter element is equipped with a transponder, and a reader is arranged in the housing structure for reading the transponder.

Other devices are also known, as described in documents FR 3 031 320 A1 and DE 10 2008 049862 A1.

SUMMARY OF THE INVENTION

It is one object of the present invention to provide a system for treating the air in the cabin of a vehicle, in particular for an agricultural machine, which is improved over the systems according to the prior art.

According to the present invention, this and other objects are achieved through a system having the technical features set out in the appended independent claim.

In particular, the system according to the present invention allows for effectively monitoring and controlling the filtering devices used for filtering the air entering the air conditioning apparatus associated with the cabin of a vehicle, in particular an agricultural machine.

It is understood that the appended claims are an integral part of the technical teachings provided in the following detailed description of the present invention. In particular, the appended dependent claims define some preferred embodiments of the present invention that include some optional technical features.

Further features and advantages of the present invention will become apparent in light of the following detailed description, provided merely as a non-limiting example and referring, in particular, to the annexed drawings as summarized below.

BRIEF DESCRIPTION OF THE DRAWINGS

FIGS. 6 to 8 are a series of elevation views of a filtering device of the system shown in the preceding figures. In particular.

For completeness' sake, the following is a list of the alphanumerical references used herein to identify parts, elements and components illustrated in the above-summarized drawings.

10 System
12 Casing
14 Inlet opening
16 Filtering device
18 Housing
20 Further inlet opening
22 Further filtering device
24 Air conditioning apparatus
25 Valve arrangement
25a Electric motor or actuator
26 Inner Space
27 Further valve arrangement
27a Further electric motor or actuator
28 RFID tag
30 RFID reader
32 Control unit
33a Main blower
33b Additional blower
33c Air flow sensor
33d Pressure sensor
34 Signaling unit
36 Memory means
38 Filter box
40 Filter body
42 Inlet grille
44 Outlet section,
46 Sealing gasket

DETAILED DESCRIPTION OF THE PRESENT INVENTION

With particular reference to FIGS. 1 to 4, numeral 10 designates as a whole a system for treating the air in the cabin of a vehicle, in particular for an agricultural machine. System 10 is made in accordance with one exemplary embodiment of the present invention.

For safety and law compliance reasons, the cabin of agricultural machines is typically kept isolated and pressurized with respect to the outside environment.

Figure 1:
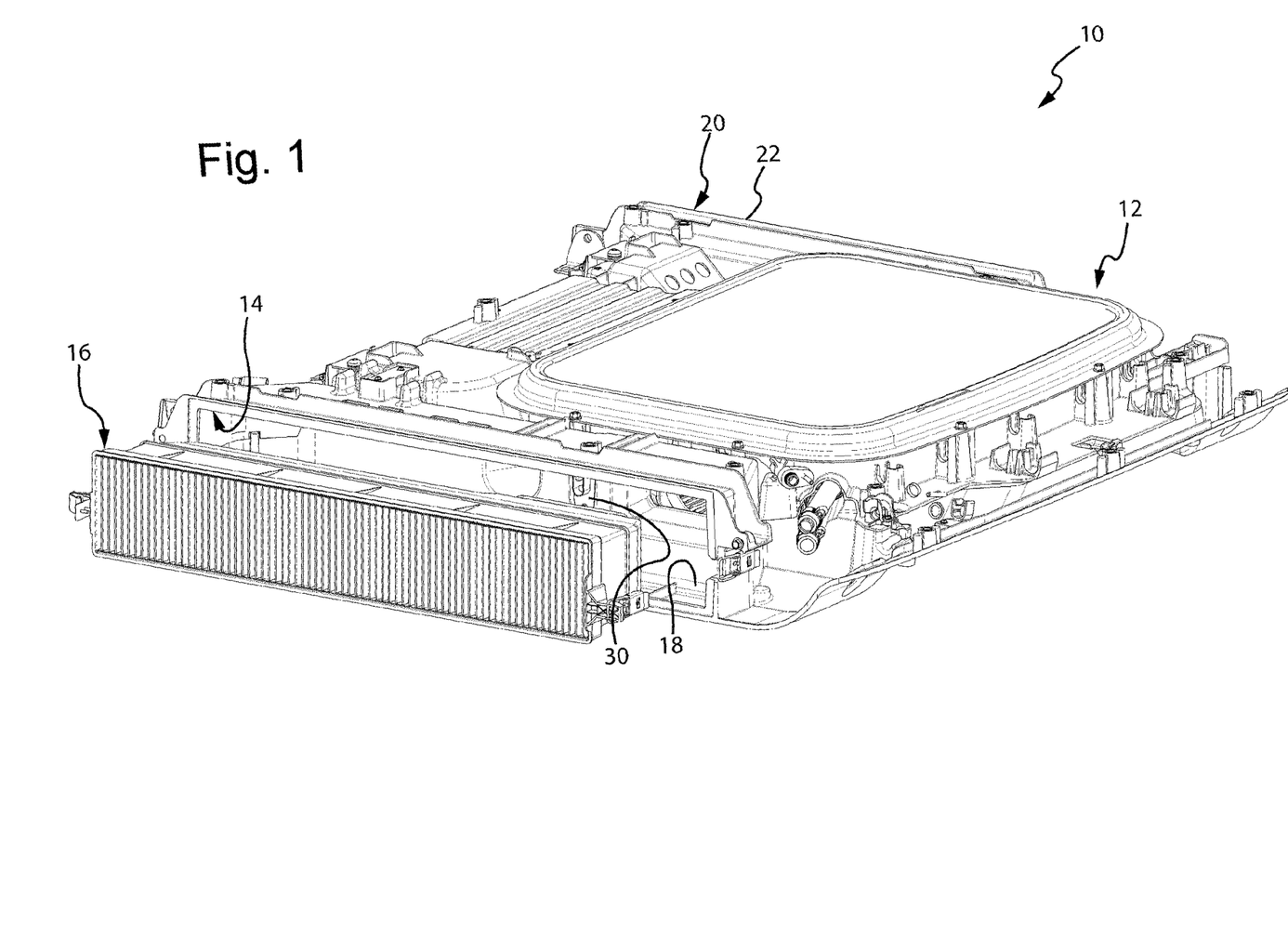
FIG. 1 is a partially exploded perspective view of a system for treating the air in the cabin of a vehicle, in particular for an agricultural machine. Such system is made in accordance with one exemplary embodiment of the present invention. In particular, this figure shows a filtering device extracted from a casing of a system.
Figure 2:
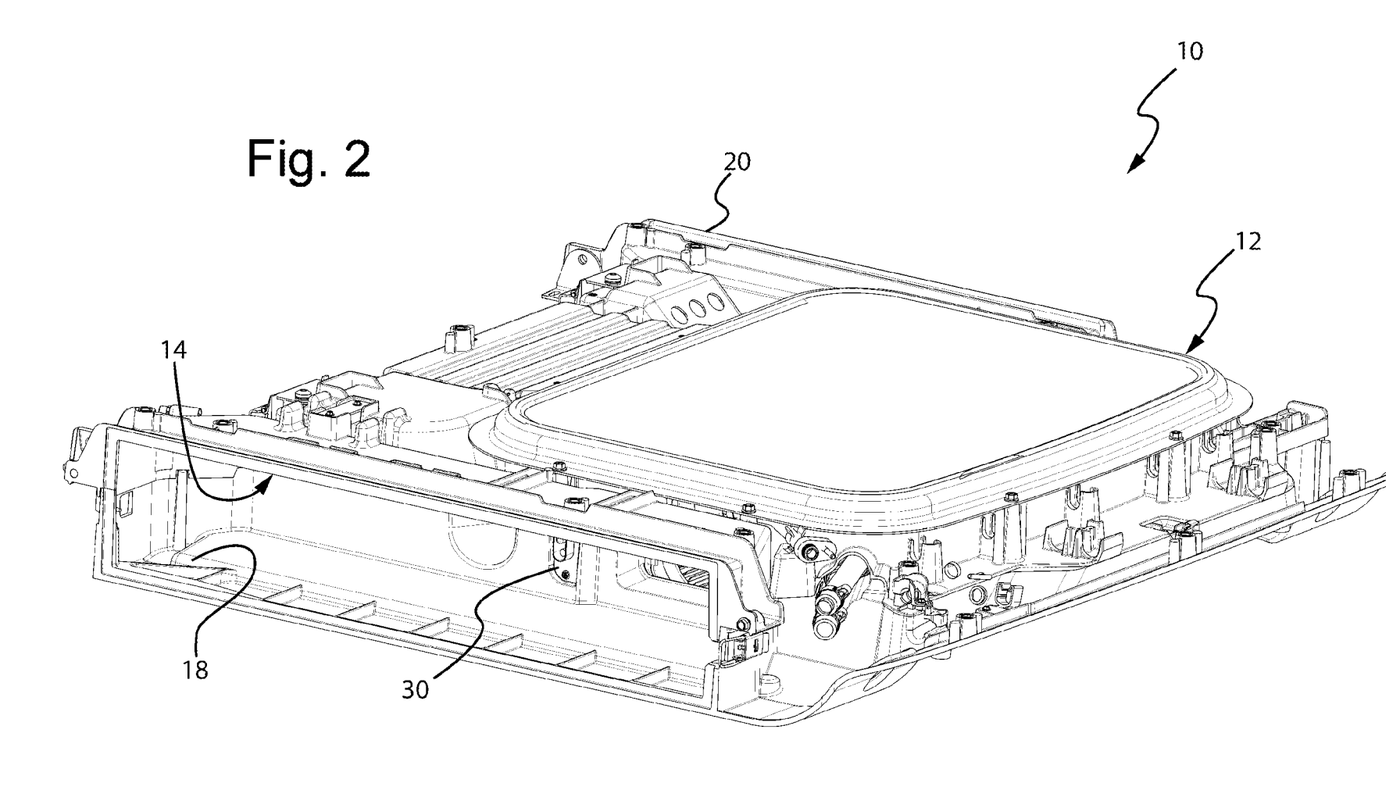
FIG. 2 is a partial perspective view similar to that of FIG. 1, wherein the filtering device has been omitted.

In the embodiment illustrated in detail in FIG. 1, system 10 is intended for installation on the roof of the vehicle, in particular at the top of the cabin of the vehicle.

System 10 comprises a casing 12 (shown in FIG. 1 without the top cover, which has been partially removed)

having at least one inlet opening 14 through which air is to be taken from the outside environment. In particular, inlet opening 14 is formed in a wall of casing 12.

System 10 further comprises a filtering device 16 replaceably mounted in a housing 18 formed in casing 12. Filtering device 16 is fluidically connected downstream of inlet opening 14. In addition, filtering device 16 is configured for filtering any contaminants contained in the air coming from the outside environment and entering through inlet opening 14. In the illustrated embodiment, filtering device 16 can provide protection against contaminating dust, aerosol and vapours, and in particular is classified as "Category 4", as defined by the UNI EN 15695-2:2018 Standard. However, as will be apparent to a person skilled in the art, in other variant embodiments filtering device 16 may belong to any typology capable of filtering contaminants in the form of at least one material selected among dust, aerosol and vapour contained in the air entering through inlet opening 14.

In the illustrated embodiment, casing 12 preferably comprises also a further inlet opening 20 (better visible in FIGS. 3a-3c), through which air is to be taken from the outside environment. The system comprises also a further filtering device 22 fluidically connected downstream of the further inlet opening 20. In particular, the further filtering device 22 can provide protection against dust, being more specifically classified as "Category 2" as defined by the UNI EN 15695-2:2018 Standard. As already described with reference to filtering device 16, in other variant embodiments the further filtering device 22 may belong to any typology capable of filtering contaminants in the form of at least one material selected from the group including dust, aerosol and vapour contained in the air entering through the further inlet opening 20.

Figure 3A:
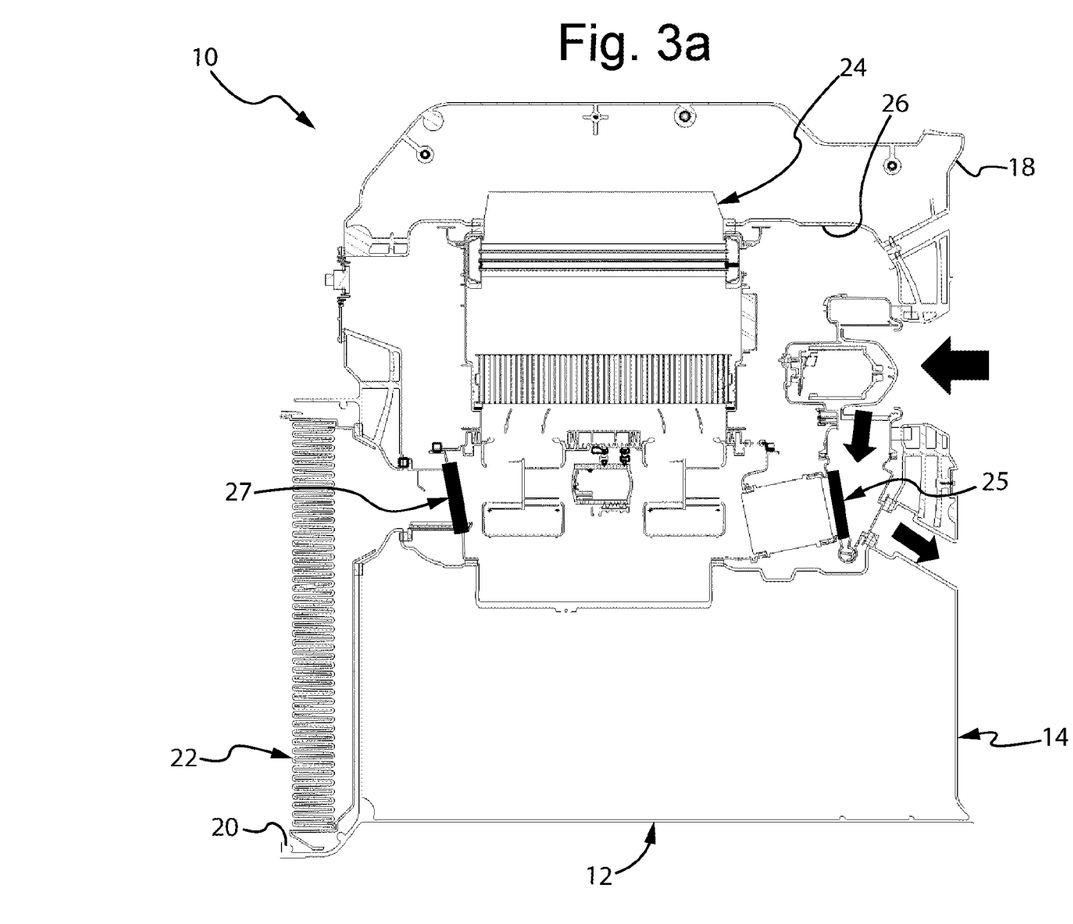
FIGS. 3a-3c represent a series of longitudinally sectioned views of the system shown in FIG. 2 (without the filtering device), which illustrate different operative conditions of such system.
Figure 3B:
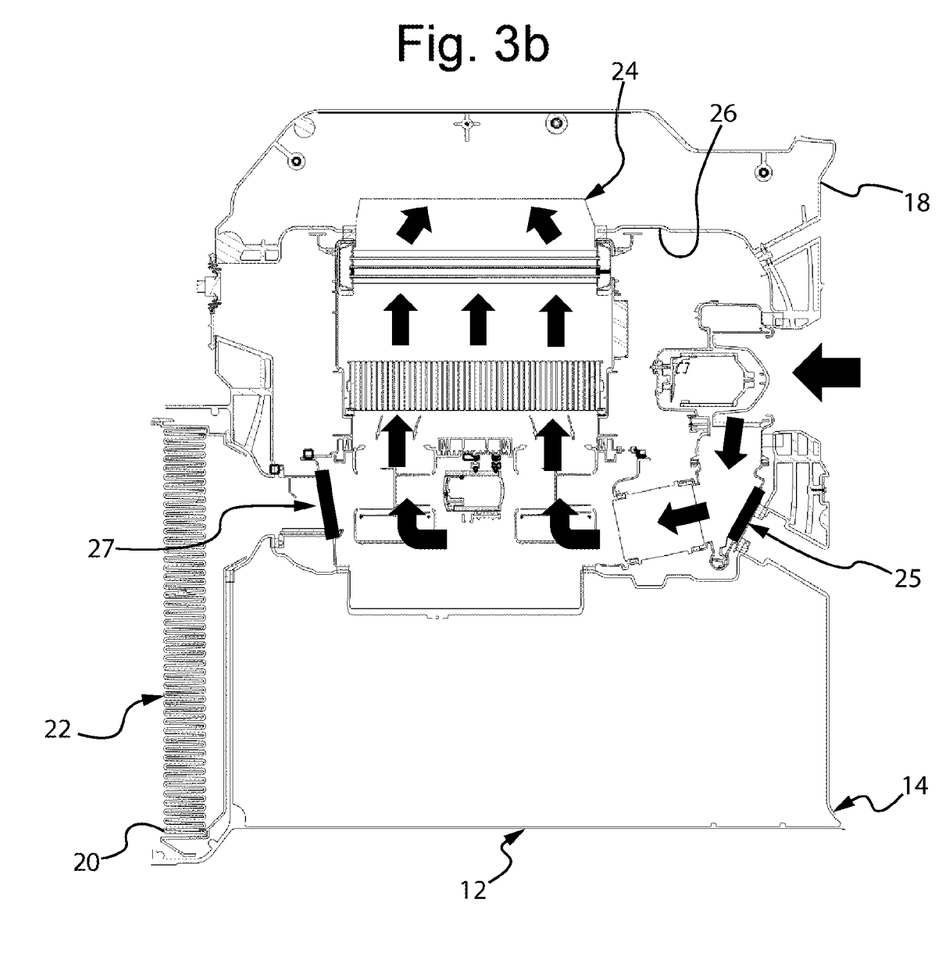
Figure 3C:
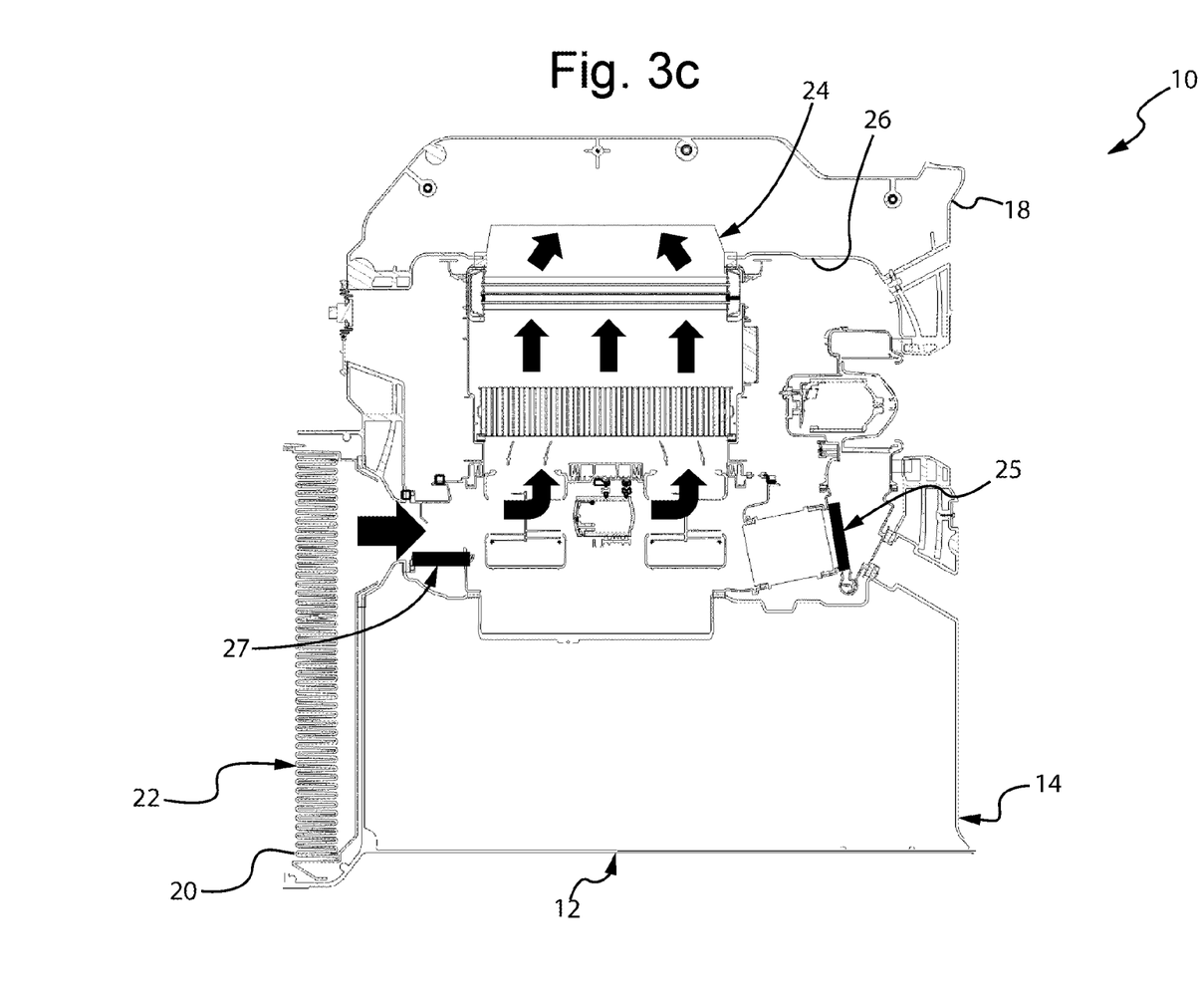
Figure 4:
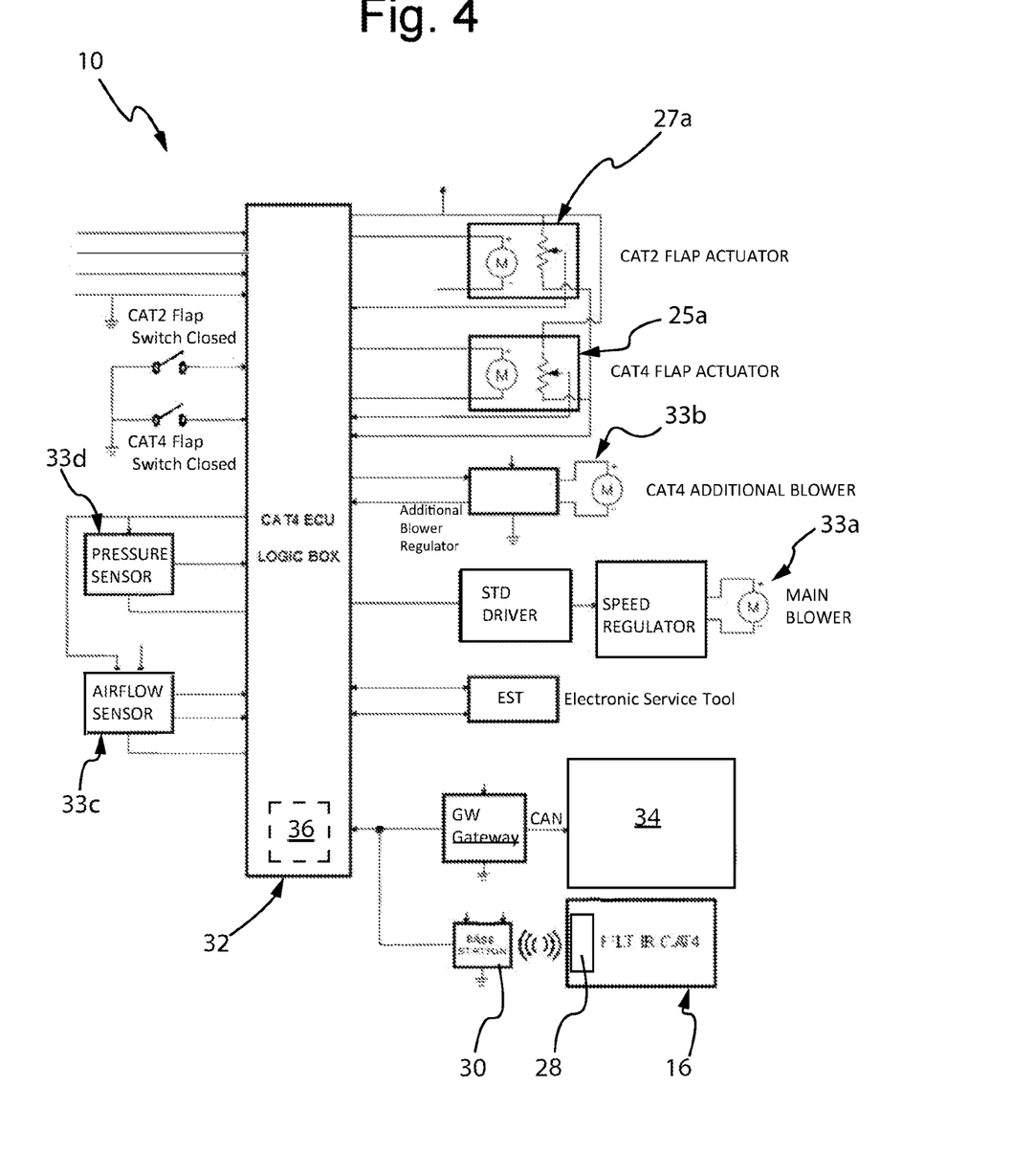
FIG. 4 is a block diagram that schematizes the system shown in the preceding figures into its functional components.
Figure 5:
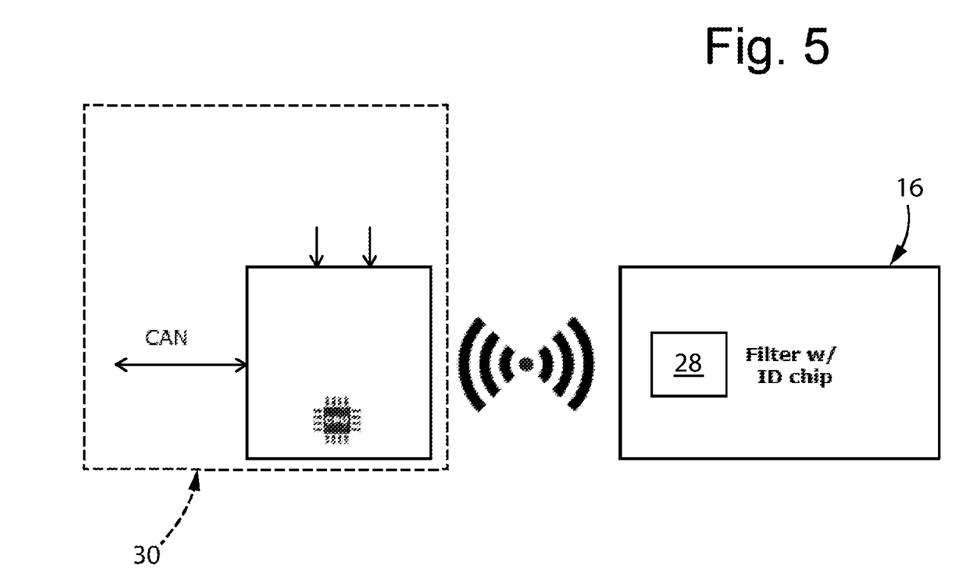
FIG. 5 is a block diagram that schematically and functionally illustrates the co-operation between an RFID tag carried by a filtering device and an RFID reader carried by the casing of the system shown in the preceding figures.

With particular reference to FIGS. 3a-3c, system 10 further comprises an air conditioning apparatus 24 sealingly contained within an inner space 26 formed in casing 12. Air conditioning apparatus 24 is fluidically connected downstream of filtering device 16 (and downstream of the further filtering device 22, if present), and is configured to be fluidically connected upstream of the cabin of the vehicle in which system 10 is to be installed, e.g. by means of a suitable outlet opening.

In the illustrated embodiment, the system comprises a valve arrangement identified by way of example by reference numeral 25. Such valve arrangement 25 is fluidically interposed between inlet opening 14 and air conditioning apparatus 24 and configured for selectively activating (FIG. 3b) and deactivating (FIGS. 3a and 3c), in a controlled manner, the fluidic communication between the latter.

For example, valve arrangement. 25 comprises a solenoid valve provided with a swinging-plate obstructor configured for selectively assuming an activation condition (FIG. 3b) and a deactivation condition (FIGS. 3a and 3c). The activation condition occurs when the swinging-plate obstructor is moved, by an associated electric motor or actuator 25a, into a position where air is conveyed from inlet opening 14 towards air conditioning apparatus 24, i.e. when filtering device 16 is operative. The deactivation condition occurs when the swinging-plate obstructor is moved, by the associated electric motor or actuator 25a, into a position where air is prevented from flowing from inlet opening 14 towards air conditioning apparatus 24, i.e. when filtering device 16 is inoperative (e.g. when it is purged, as shown in FIG. 3a, or when only the further filtering device 22 is used, as shown in FIG. 3c).

Moreover, the interruption of such fluidic communication is desirable when, for example, the associated filtering device 16 is malfunctioning or has reached the end of its service life, since it would jeopardize the safety of the operator in the cabin of the vehicle in which the system has been installed.

Since it envisages also a further inlet opening 20 and a further filtering device 22, the illustrated embodiment likewise envisages a further valve arrangement 27. As described above with reference to valve arrangement 25, the further valve arrangement 27 is fluidically interposed between the further inlet opening 20 and air conditioning apparatus 24, and is configured for selectively activating and deactivating, in a controlled manner, the fluidic communication between the latter.

For example, the further valve arrangement 27 comprises a solenoid valve provided with a swinging-plate obstructor configured for selectively assuming an activation condition (FIG. 3c) and a deactivation condition (FIGS. 3a and 3b). The activation condition occurs when the swinging-plate obstructor is moved, by an associated electric motor or actuator 27a, into a position where air is conveyed from the further inlet opening 20 towards air conditioning apparatus 24, i.e. when the further filtering device 22 is operative. The deactivation condition occurs when the swinging-plate obstructor is moved, by the associated electric motor or actuator 27a, into a position where air is prevented from flowing from the further inlet opening 20 towards air conditioning apparatus 24, i.e. when the further filtering device 22 is inoperative.

As aforementioned, filtering device 16 is configured for being replaceably mounted in housing 18, i.e. it can be inserted and removed, e.g. in a repeatable manner, from casing 12 through housing 18. For example, filtering device 16 may be secured into housing 18 in a per se known manner by using reversibly releasable coupling means (not numbered).

Filtering device 16 further comprises an RFID tag 28 of a per se known type, operating according to the radio-frequency identification technology. RFID tag 28 contains identification information about filtering device 16 whereto it has been applied. In the illustrated embodiment, the identification information is originally stored into RFID tag 28 during an initialization phase.

Furthermore, system 10 comprises an RFID reader 30 mounted in housing 18. RFID reader 30 is configured for being proximal to and co-operating with RFID tag 28 to read the identification information, when filtering device 16 is mounted in housing 18. However, such identification information may preferably be modified by RFID reader 30 during the use of filtering device 16 in system 10.

System 10 comprises also a control unit 32 connected to RFID reader 30 and configured for receiving the identification information read from RFID tag 28 and for executing predefined operations as a function of the identification information received.

For example, such predefined operations may comprise the fact that control unit 32 is configured for selectively putting valve arrangement 25 into the deactivation (or activation) condition and/or for transmitting a signal as a function of the identification information received.

In the illustrated embodiment, the connection or communication channel between RFID reader 30 and control unit 32 may be effected, for example, via communication over a CAN bus or a LIN bus.

In the illustrated embodiment, control unit 32 is advantageously configured for co-operating with further components of system 10 such as, by way of non-limiting example:
a main blower 33a, an additional blower 33b intended to create an air flow from inlet opening 14 towards air conditioning apparatus 24, an air flow sensor 33c, and an air pressure sensor 33d.

By way of non-limiting example, on the one hand control unit 32 can selectively enable or disable the fluidic communication between inlet opening 14 and air conditioning apparatus 24, in particular by controlling valve arrangement 25. Typically, control unit 32 can supply current to electric motor or actuator 25a, which then puts valve arrangement 25 (e.g. with the swinging-plate obstructor) respectively into the activation condition and into the deactivation condition, in which such valve arrangement 25 respectively allows or prevents an air flow from inlet opening 14 towards air conditioning apparatus 24.

Still by way of non-limiting example, on the other hand control unit 32 may be configured for outputting one or more signals intended to permit the communication of what is operatively going on as far as filtering device 16 is concerned. In the illustrated embodiment, system 10 further comprises a signaling device 34 (FIG. 4), in particular a visualization device, e.g. comprising a dashboard and/or a display. Signaling device 34 may be configured for receiving the signal outputted by control unit 32 and for emitting a corresponding perceivable signal (e.g. an audible or visual signal) to an operator, indicating the condition of filtering device 16 detected by said control unit 32.

Let us now consider the case wherein RFID reader 30 is not able to co-operate with the RFID tag 28. This case may correspond to the absence of filtering device 16, which may have been removed without having been replaced with another one. Alternatively, this case may correspond to an improper installation of filtering device 16 in system 10.

In the above case, according to the embodiment illustrated herein, control unit 32 is configured for executing at least one of the following operations:

selectively deactivating the fluidic communication between inlet opening 14 and air conditioning apparatus 24 and 22 (e.g. by appropriately controlling valve arrangement 25 to put it into the deactivation condition), and outputting (e.g. to signaling device 34) a fault signal indicating a possible improper installation or absence of said filtering device 16.

In the above case, therefore, in addition to performing the function of obtaining—from RFID tag 28—said identification information about filtering device 16, RFID reader 30 also performs the function of indicating the proper installation and/or the presence of the latter. This avoids the necessity of employing, for example, any switches or commutators or check elements to verify the correct positioning of filtering device 16 and to ensure the proper operability of system 10.

Preferably, said identification information comprises an individual identifier datum univocally associated with the single filtering device 16 carrying RFID tag 28. In particular, such identifier datum is determined by RFID tag 28 during an initial configuration phase of filtering device 16, when it is installed in system 10 for the first time.

In the illustrated embodiment, the individual identifier datum is essentially a serial number representing the "identity" attributed to filtering device 16 to which RFID tag 28 has been applied. The attribution of the individual identifier datum occurs, for example, by means of an encryption procedure carried out by control unit 32.

In the illustrated embodiment, control unit 32 is configured for storing the individual identifier datum into a list of used individual identifier data contained in memory means 36.

Furthermore, said memory means 36 may be included in system 10, e.g. they may be integrated into control unit 32.

In the illustrated embodiment, the identification information stored in RFID tag 28 further comprises a total usage datum representative of the period of time during which filtering device 16 carrying RFID tag 28 has been operatively used. The total usage time substantially corresponds to the cumulative time during which filtering device 16 has remained in the associated housing 18 while valve arrangement 25 was in the operative condition and there was an air inflow through inlet opening 20 towards air conditioning apparatus 24 (FIGS. 3a and 3b).

In the illustrated embodiment, control unit 32 is configured for making a comparison between the total usage datum detected by RFID reader 30 and a threshold value.

In particular, as will be further discussed below, the threshold value may be:

a fixed predetermined value for any filtering device 16 (e.g. 170 hours), or a value which can be determined by control unit 32 by selecting it among a plurality of threshold values contained in memory means 36, or a value which can be calculated by control unit. 32 according to predefined criteria.

Let us consider the case wherein the total usage datum is higher than said threshold value. This case may correspond, for example, to the condition wherein filtering device 16 has exceeded its service life, which may imply a deterioration in its performance.

In such a case, control unit. 32 is configured for executing at least one of the following operations:

selectively deactivating the fluidic communication between inlet opening 14 and air conditioning apparatus 24 (e.g. by appropriately controlling valve arrangement 25; and outputting (e.g. to signaling device 34) a depletion signal representative of the end of the service life of filtering device 16 carrying RFID tag 28.

Let us now consider the case wherein the total usage datum is lower than the threshold value. This case may correspond to the normal operating condition of filtering element 16, the performance of which falls within the standard operability range and does not jeopardize its reliability.

In the above-mentioned case, control unit 32 is configured for executing at least one of the following operations:

selectively activating the fluidic communication between inlet opening 14 and air conditioning apparatus 24; and outputting a residual life signal representative of the remaining service life of filtering device 16 carrying RFID tag 28, determined as a function of the threshold value and the total usage datum.

For example, when signaling device 34 includes a display, the residual life signal issued by said signaling device 34 may display a bar having a length proportional to the residual service life of filter 16.

In particular, said threshold value may be contained in memory means 36. As mentioned above, such memory means 36 may be included in system 10, e.g. integrated into control unit 32.

Preferably, the identification information stored in RFID tag 28 comprises also a typology datum representative of the type and/or technical specifications of filtering device 16 carrying RFID tag 28. In particular, such typology datum is stored into RFID tag 28 during an initial configuration phase of filtering device 16 of system 10. In the illustrated embodiment, the typology datum may include the category of filtering device 16 carrying RFID tag 28 (e.g. "Category 3" or "Category 4" according to the UNI EN 15695-2:2018 Standard). In particular, when the typology datum is stored into RFID tag 28, it is conveniently "write-protected" to avoid any future modification of such information.

Advantageously, but not necessarily, control unit 32 may be configured for determining (calculating or selecting) said threshold value as a function of said typology datum stored in RFID tag 28. In particular, the threshold value may be selected by control unit 32 from tables stored in memory means 36, such tables associating a respective threshold value with each typology datum. For example, a threshold value corresponding to 170 hours may be associated with a "Category 4" filter, whereas a lower threshold value may be associated with a "Category 3" filter.

According to the embodiment illustrated herein, control unit 32 is configured for updating the total usage datum of filtering device 16 stored in RFID tag 28 by means of RFID reader 30.

In particular, control unit 32 is configured for executing the following operations:
  reading the total usage datum previously stored in RFID tag 28 by means of RFID reader 30;
  calculating a current usage datum representative of the time of active utilization of filtering device 16 during the current operation of system 10;
  calculating an updated total usage datum as a function of the previously stored total usage datum and said current usage datum;
  operating RFID reader 30 in order to cause RFID tag 28 to store the updated total usage datum.

In particular, the above operations may occur periodically at regular intervals, e.g. every 180 seconds.

Preferably, control unit 32 is also configured for storing into memory means 36 the updated total usage datum, associating it with the individual identifier datum of filtering element 16 carrying RFID tag 28, in particular at regular intervals during the use of system 10. In other words, memory means 36 associate the respective updated total usage data with each individual identifier datum contained in the list of used individual identifier data.

In the illustrated embodiment, control unit 32 is configured for executing the following operations:
  reading the individual identifier datum stored in RFID tag 28 by means of RFID reader 30;
  reading the last total usage datum stored in RFID tag 28 by means of RFID reader 30;
  reading the last total usage datum stored in memory means 36 and referred to the individual identifier datum associated with RFID tag 28 in proximity to RFID reader 30; and
  comparing the last total usage datum read from RFID tag 28 with the last total usage datum read from memory means 36.

Let us now consider the case wherein there is a difference between the compared total usage data which exceeds a comparison threshold value. This case may correspond, for example, to an attempt to tamper RFID tag 28 associated with filtering device 16.

In this case, control unit 32 may be configured for executing at least one of the following operations:
  selectively deactivating the fluidic communication between inlet opening 14 and air conditioning apparatus 24 (e.g. by appropriately controlling valve arrangement 25); and
  outputting (e.g. to signaling device 34) an alteration signal representative of a possible tampering of RFID tag 28 carried by filtering device 16.

Furthermore, in this case control unit 32 may optionally be configured for transmitting such alteration signal to the diagnostic system of the customer or user of system 10, which will thus be informed about the possible tampering.

In particular, memory means 36 may also store the individual identifier datum associated with RFID tag 28 into a list of unauthorized individual identifier data of "black-listed" filtering devices 16. During the operation of system 10, therefore, control unit. 32 may be arranged for comparing the individual identifier datum associated with filtering device 16 inserted in housing 18 with the list of black-listed individual identifier data stored in memory means 36; if the individual identifier datum is included in such "black list", then control unit 32 may:
  selectively deactivate the fluidic communication between inlet opening 14 and air conditioning apparatus 24 (e.g. by appropriately controlling valve arrangement 25); and/or
  output (e.g. to signaling device 34) said alteration signal.

According to a further illustrative embodiment of the present invention, control unit 32 is associated with a further transmission module configured for transmitting said identification information relating to filtering device 16 (stored in memory means 36 and/or in RFID tag 28) to a main server via a telecommunications network, e.g. the Internet network. In particular, the exchange of information between the transmission module and the main server may advantageously occur by cloud computing. The transmission module may be structurally and/or functionally separate from and independent of control unit. 32, and connected thereto. As an alternative, the transmission module may be structurally and/or functionally integrated into control unit 32.

Preferably, the identification information contained in said main server can be read by a fixed or mobile external communication device (such as a cellular phone, a smartphone, a tablet, a laptop computer, or the like) via the telecommunications network. In particular, read-only access is granted to the external communication device via the telecommunications network through an enabled account.

Preferably, control unit 32 and/or the external communication device may be configured for executing check and verification operations on the identification information contained in RFID tag 28 and/or stored in memory means 36, comparing it with the same data contained in the main server. In particular, if the individual identifier associated with filtering device 16 inserted in housing 18 is included in the list of unauthorized individual identifier data stored in the main server, then control unit 32 may cause the execution of several operations including, for example:
  inhibiting the fluidic communication between inlet opening 14 and air conditioning apparatus 24, and/or
  outputting an alert signal visible to the user, and/or
  transmitting an alert signal to the main server (which may, for example, coincide with the customer's or user's diagnostic system provider).

According to yet another exemplary embodiment of the present invention, RFID tag 28 is also equipped with near field communication functionalities, in particular compliant with the NFC Standard, so as to be able to interface directly with a fixed or mobile external communication device (such as a cellular phone, a smartphone, a tablet, a laptop computer, or the like). In particular, the external communication device can be configured for reading said identification information contained in RFID tag 28, e.g. so that it can be displayed by an operator (typically on a screen operatively associated with the external communication device). In particular, read-only access is granted to the external communication device through an enabled account.

Figure 6:
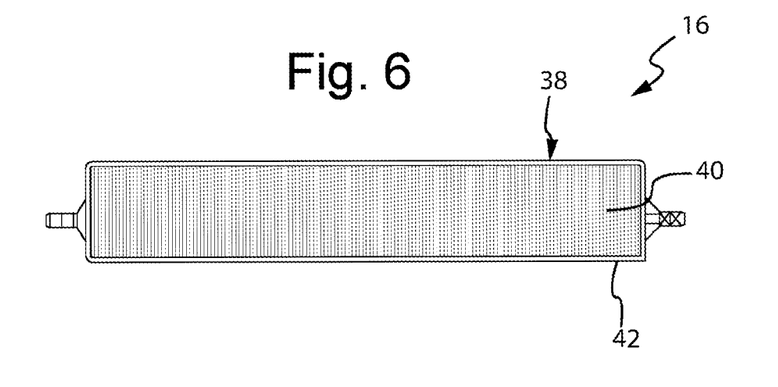
FIG. 6 is a front elevation view.
Figure 7:
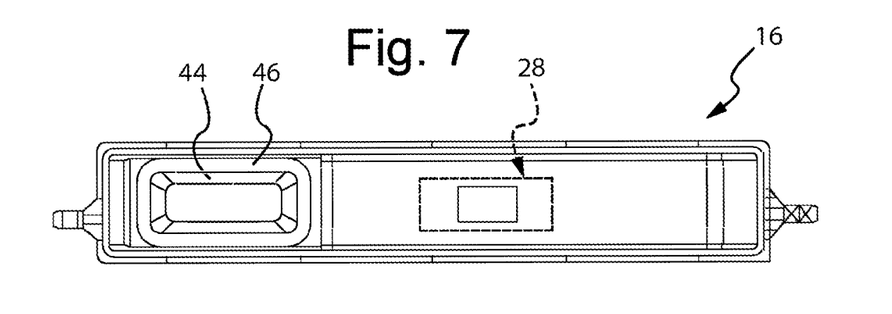
FIG. 7 is a rear elevation view.
Figure 8:
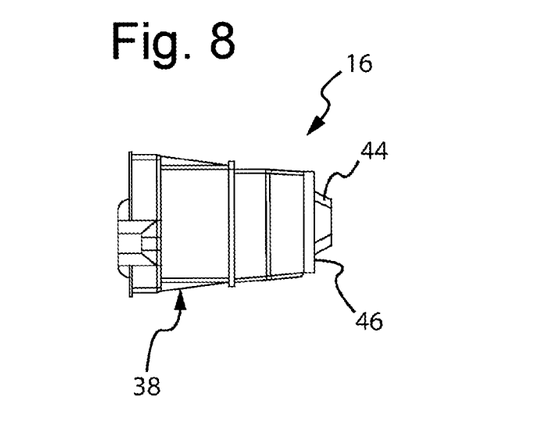
FIG. 8 is a side elevation view.

With particular reference to FIGS. 6 to 8, the following will describe some structural features of filtering device 22 according to the previously illustrated embodiment.

In the illustrated embodiment, filtering device 16 comprises a filter box 38 and a filter body 40 housed in filter box 38.

Preferably, filtering device 16 comprises an inlet grille 42 (FIG. 6) mounted on filter box 38 upstream of filter body 40.

Furthermore, filter box 38 has an outlet section 44, in particular on the side opposite to the inlet grille 42. When mounted to casing 12, outlet section 44 is intended to be fluidically connected to air conditioning apparatus 24 through valve arrangement 25.

For example, outlet section 44 is a portion protruding rearward from filter box 38. In particular, outlet section 44 can be inserted into an associated recess (not numbered) of housing 18, communicating with air conditioning apparatus 24 through valve arrangement 25.

Preferably, around outlet section 44 there is also a sealing gasket 46. In the example illustrated herein, when filtering device 16 is inserted into housing 18 sealing gasket 46 is compressed between the bottom of filter box 38 and the bottom of housing 18.

In the illustrated embodiment, RFID tag 28 is situated on the bottom of filtering device 16, facing towards the bottom of housing 18, which carries RFID reader 30. In particular, RFID tag 28 is situated on the bottom of filter box 38, e.g. near outlet section 44.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A system for treating air in a cabin of a vehicle; said system comprising:
   a casing having an inlet opening through which air is to be taken from an outside environment;
   a filtering device fluidically connected downstream of the inlet opening and configured for filtering contaminants comprising at least one material among dust, aerosol and vapour contained in said air; and
   an air conditioning apparatus sealingly contained within an inner space formed in said casing; said air conditioning apparatus being fluidically connected downstream of said filtering device and being configured to be fluidically connected upstream of the cabin of the vehicle in which said system is to be installed;
   wherein said filtering device is configured for being replaceably mounted in a housing formed in said casing; said filtering device comprising a radio frequency identification (RFID) tag containing identification information about the filtering device;
   wherein the system comprises an RFID reader mounted in said housing and configured for being proximal to and co-operating with said RFID tag to read said identification information, when said filtering device is mounted in said housing;
   wherein the system comprises a control unit connected to said RFID reader and configured for receiving said identification information read from said RFID tag and for executing predefined operations as a function of said identification information received;
   wherein said identification information comprises an individual identifier datum univocally associated with the single filtering device carrying the RFID tag;
   wherein said identification information further comprises a total usage datum representative of a period of time during which the filtering device carrying the RFID tag has been operatively used;
   wherein said control unit is configured for updating the total usage datum of said filtering device stored in the RFID tag by the RFID reader;
   wherein said control unit is further configured for storing the updated total usage datum into a memory while associating said updated total usage datum with the individual identifier datum of the filtering element carrying the RFID tag; and
   wherein said control unit is configured for executing the following operations:
   reading the individual identifier datum stored in the RFID tag by the RFID reader;
   reading a last total usage datum stored in the RFID tag by the RFID reader;
   reading the last total usage datum stored in said memory and referred to the individual identifier datum associated with the RFID tag in proximity to the RFID reader; and
   comparing the last total usage datum read from said RFID tag with the last total usage datum read from said memory.

2. The system according to claim 1, wherein, when said RFID reader is not able to co-operate with said RFID tag, said control unit is configured for executing at least one of the following operations:
   selectively deactivating fluidic communication between said inlet opening and said air conditioning apparatus, and
   outputting a fault signal indicating a possible improper installation or absence of said filtering device.

3. The system according to claim 1, wherein said control unit is configured for determining said individual identifier datum when said filtering device is installed into said housing for a first time.

4. The system according to claim 3, wherein said control unit is configured for storing said individual identifier datum into a list of used individual identifier data contained in said memory.

5. The system according to claim 1, wherein said identification information further comprises a typology datum indicative of a type and/or technical specifications of the filtering device carrying the RFID tag.

6. The system according to claim 5, wherein said control unit is configured for making a comparison between said total usage datum and a threshold value.

7. The system according to claim 6, wherein said control unit is configured for calculating or selecting a threshold value as a function of said typology datum.

8. The system according to claim 6, wherein, when said total usage datum exceeds said threshold value, said control unit is configured for executing at least one of the following operations:
   selectively deactivating the fluidic communication between said inlet opening and said air conditioning apparatus; and outputting a depletion signal representative of an end of service life of the filtering device carrying the RFID tag.

9. The system according to claim 6, wherein, when said total usage datum is lower than said threshold value, said control unit is configured for executing at least one of the following operations:
- selectively activating the fluidic communication between said inlet opening and said air conditioning apparatus; and
- outputting a residual life signal representative of remaining service life of the filtering device carrying the RFID tag, determined as a function of said threshold value and said total usage datum.

10. The system according to claim 1, wherein said control unit is configured for executing the following operations:
- reading the total usage datum previously stored in the RFID tag by the RFID reader;
- calculating a current usage datum representative of a time of active utilization of the filtering device during current operation of the system;
- calculating an updated total usage datum as a function of the previously stored total usage datum and said current usage datum; and
- operating the RFID reader to cause the RFID tag to store the updated total usage datum.

11. The system according to claim 1, wherein, when a difference between the compared total usage data exceeds a predetermined comparison threshold value, the control unit is configured for executing at least one of the following operations:
- selectively deactivating the fluidic communication between the inlet opening and the air conditioning apparatus; and
- outputting an alteration signal representative of a possible tampering of the RFID tag carried by the filtering device.

12. The system according to claim 11, wherein, when the difference between the compared total usage data exceeds said comparison threshold value, said memory will store the individual identifier datum associated with said RFID tag into a list of black-listed individual identifier data relating to filtering devices that may have been tampered with.

13. The system according to claim 1, wherein said control unit is associated with a further transmission module configured for transmitting said identification information relating to said filtering device to a main server via a telecommunications network.

14. The system according to claim 1, wherein said RFID tag is provided with near field communication to interface directly with an external communication device accessing said identification information relating to said filtering device.

15. The system according to claim 14, wherein said external communication device is configured for displaying said identification information.

16. A vehicle comprising the system according to claim 1.

* * * * *